June 13, 1967  R. F. REIFERS  3,325,349
METHOD AND MOLD FOR CONTROLLING STOCK THICKNESS
IN A PULP MOLDING OPERATION
Filed March 18, 1964  4 Sheets-Sheet 1

INVENTOR
RICHARD F. REIFERS

BY  KARL W. FLOCKS
ATTORNEY

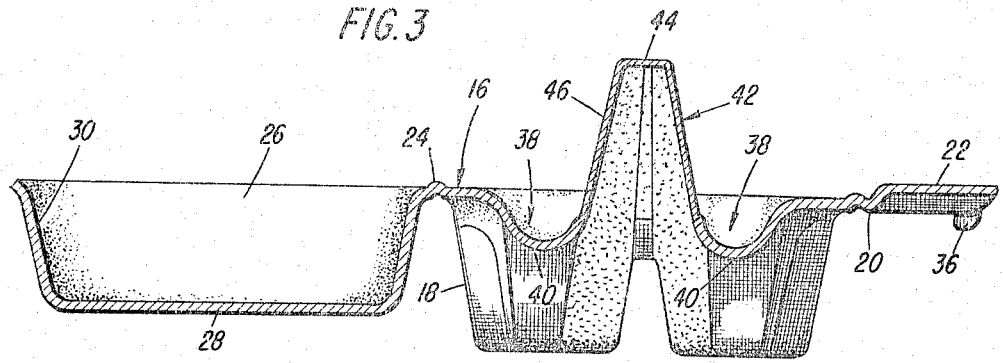
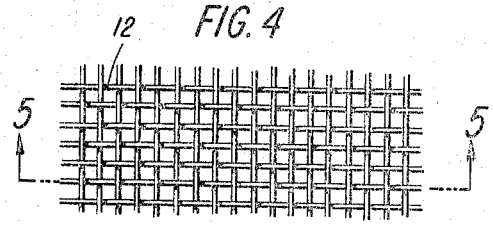
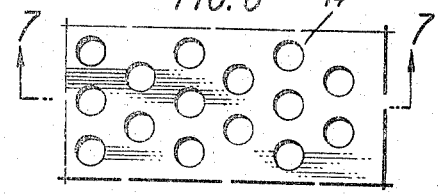
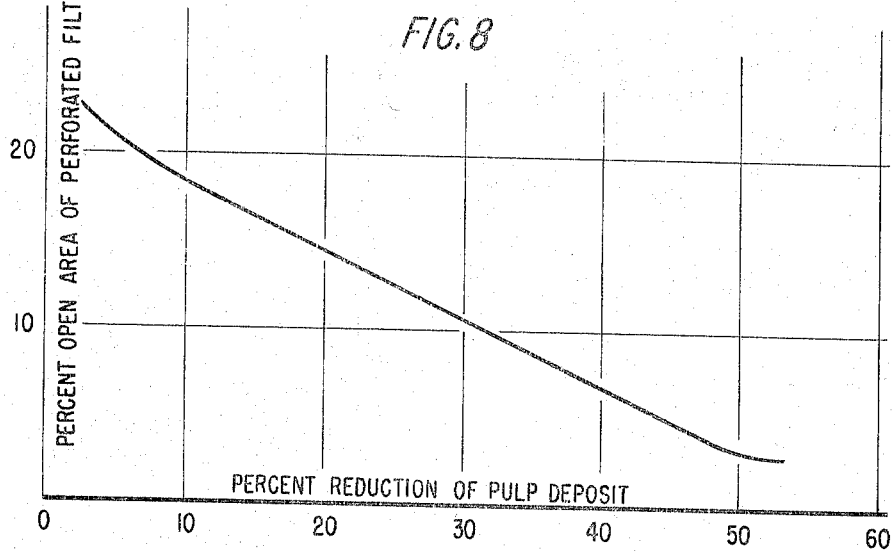

June 13, 1967  R. F. REIFERS  3,325,349
METHOD AND MOLD FOR CONTROLLING STOCK THICKNESS
IN A PULP MOLDING OPERATION
Filed March 18, 1964  4 Sheets-Sheet 3

INVENTOR
RICHARD F. REIFERS
BY Karl W. Flocks
ATTORNEY

June 13, 1967 R. F. REIFERS 3,325,349
METHOD AND MOLD FOR CONTROLLING STOCK THICKNESS
IN A PULP MOLDING OPERATION
Filed March 18, 1964 4 Sheets-Sheet 4

INVENTOR
RICHARD F. REIFERS

BY KARL W. FLOCKS
ATTORNEY

United States Patent Office 3,325,349
Patented June 13, 1967

3,325,349
METHOD AND MOLD FOR CONTROLLING STOCK THICKNESS IN A PULP MOLDING OPERATION
Richard F. Reifers, New Canaan, Conn., assignor to Diamond International Corporation, New York, N.Y., a corporation of Delaware
Filed Mar. 18, 1964, Ser. No. 352,787
6 Claims. (Cl. 162—228)

The present invention is a continuation-in-part of applicant's co-pending application Ser. No. 18,623, filed Mar. 30, 1960, entitled, "Molded Egg Carton," now Patent No. 3,128,932, and of Ser. No. 155,523, filed Oct. 30, 1961, entitled, "Method and Mold for Controlling Stock Formation in a Pulp Molding Operation," now Patent No. 3,185,615.

The present invention relates to pulp molding and more particularly to a new construction of pulp molding die, new methods of pulp molding utilizing this die and the resulting product.

Heretofore not much success has been achieved in attempting to reduce the pulp thickness of molded pulp articles by restricting the drainage holes behind the screen molding die. Also attempts to reduce the number of openings in the wire screen molding die itself have not proved commercially useful. In like manner, building up the thickness of pulp in unit areas to a large dimension has been attempted through the use of coarser wires and increased back drainage of the die, and this too has not proved to be commercially successful.

The broad concept of blocking out relatively large unit areas of the die for various purposes has likewise been proposed. However, all prior attempts have been made with one or more large blocked out areas.

It might logically be assumed that a smaller amount of pulp deposit could be obtained under identical conditions of pulp molding by simply replacing the ordinary 25% open mesh screen with a finer mesh screen in the areas where less pulp deposit is required. This, however, has not been found to be the case, because the relatively small amount of water to be removed from the pulp in the "thin" areas is always less than the finest mesh is capable of draining during the dip interval. No matter how closely the screen is woven, that is acceptable for production use, the criss-crossing wires afford excellent lateral drainage of the white water, and stock will be deposited in practically the same thickness as that deposited on ordinary 60 mesh screen during the same dip interval while under the same vacuum. Screen wire woven to less than 5% open area has an effect of pulp reduction but it is impractical because the wire becomes clogged quickly with pulp making it inoperative. Also, it has been found under production conditions that stock turbulence prevents uniform deposit of pulp and open areas easily occur.

This difficulty in controlling the thickness of pulp deposition on the commercial standard mold wire has been found to be caused by the fact that immediately after deposition of a first thin layer of pulp fibers, such pulp layer becomes an effective barrier to the passage of water and the drainage rate of the pulp itself, rather than the holes in the mold or wire, becomes the controlling factor in the deposition of further pulp.

It is clearly advantageous for many reasons to be able to control the deposition of pulp. One advantage resulting from such control is the ability to manufacture pulp articles having a first thickness of pulp deposit in one area of the article and a second thickness of pulp deposit in another area. For example, in the formation of a pulp tray or egg carton, it may be desirable to form certain relatively weak portions of the article of a greater thickness than another relatively strong portion of the article where the greater thickness is not essential.

It is an object of the present invention to provide an improved method of pulp molding for depositing a variable thickness molded pulp article.

It is a further object of the present invention to provide an improved method of pulp molding for depositing a molded pulp article having a lesser thickness of deposit in certain areas than in other areas thereof.

It is a further object of the present invention to provide an improved pulp molding die which can be used for pulp molding articles of variable thickness.

It is a further object of the present invention to provide an improved pulp molding die which can be used for pulp molded articles having a lesser thickness of deposit in certain areas than in other areas thereof.

It is a further object of the present invention to provide an improved pulp molding method and die which can be used for pulp molding articles of lesser thickness than is conventionally deposited with the same pulp and vacuum conditions.

A further objpect of the invention is to provide an improved pulp molded articles having portions thereof of a lesser thickness than other portions thereof.

A further object of the invention is to provide improved pulp molded articles of variable thickness.

A further object of the invention is to provide improved pulp molding method whereby two articles can be molded simultaneously yet each article can have a different thickness of pulp deposited.

Other objects and the nature and advantages of the instant invention will be apparent from the following description taken in conjunction with the accompanying drawings, wherein:

FIG. 3 is a cross-sectional view of an egg carton made in accordance with this invention;

FIG. 4 is an enlarged top plan view of a small portion of the conventional wire screen used in pulp molding;

FIG. 5 is an enlarged cross-sectional view along line 5—5 of FIG. 4;

FIG. 6 is an enlarged top plan view of a small portion of perforated metal as used in accordance with the present invention;

FIG. 7 is an enlarged cross-sectional view along line 7—7 of FIG. 6;

FIG. 8 is a graph showing the amount of pulp deposit reduction depending upon the percent open of the perforated surface;

In the usual process of molding pulp articles, such as egg cartons for example, using a standard molding pulp material, the same molding time and vacuum, the entire product resulting has a uniform thickness of pulp throughout the product and the weight of each product so molded is nearly uniform. Various procedures have been tried in an attempt to reduce the overall weight of the article and also to make the weaker areas of the article thicker than the stronger areas thereof.

The present invention solves these problems by utilizing a new form of molding die, or substituting a portion of this new form of molding die for the conventional wire screen molding die. The new form of molding die is a perforated material having hole patterns and sizes which provide sufficient restriction to actually retard drainage and thereby retard pulp deposit during the dip interval over that normally deposited under the same conditions utilizing a conventional wire screen molding die or a perforated material die having hole sizes and patterns which do not retard the drainage.

This effect is proven by the graph shown in FIG. 8. This graph plots the percent reduction of pulp deposit for a conventional pulp against percent open area of the perforated material die. As shown, with open areas of 3 to 20%, using openings of 0.016" diameter, a reduction of pulp deposit of from approximately 45%–8% can be achieved over that obtained using the conventional wire screen die under similar conditions.

It has been found that for conventional wood pulps as used in pulp molding, the diameter of the perforations can vary from 0.006" for a finer pulp up to 0.031" for a coarser pulp. The preferred diameter of perforations for average pulps is 0.016". It has been found that when the perforations are too large, they permit the passage of "fines" and perforations which are too small tend to plug rather easily during use. It has also been found that when the percent open area of the die is too small, that is less than 3%, for a conventional pulp using a perforated die having perforations of 0.016", that a satisfactory continuous membrane is not deposited. Likewise, when the percent open area is greater than approximately 20%, the reduction in pulp deposit is insignificant over that obtained when utilizing a wire screen molding die. When it is desired to produce an article having nearly uniform pulp deposit, the hole sizes and the pattern of hole distribution in the perforated material are uniform with the holes spaced as equidistant as possible from adjacent holes, as shown in FIGS. 6 and 7 of the drawings. However, when more than one thickness of pulp deposit 60 is desired in an article molded from the same die, varying patterns of hole distribution and sizes may be used as shown in FIGS. 11–18 of the drawings.

Figure 1:
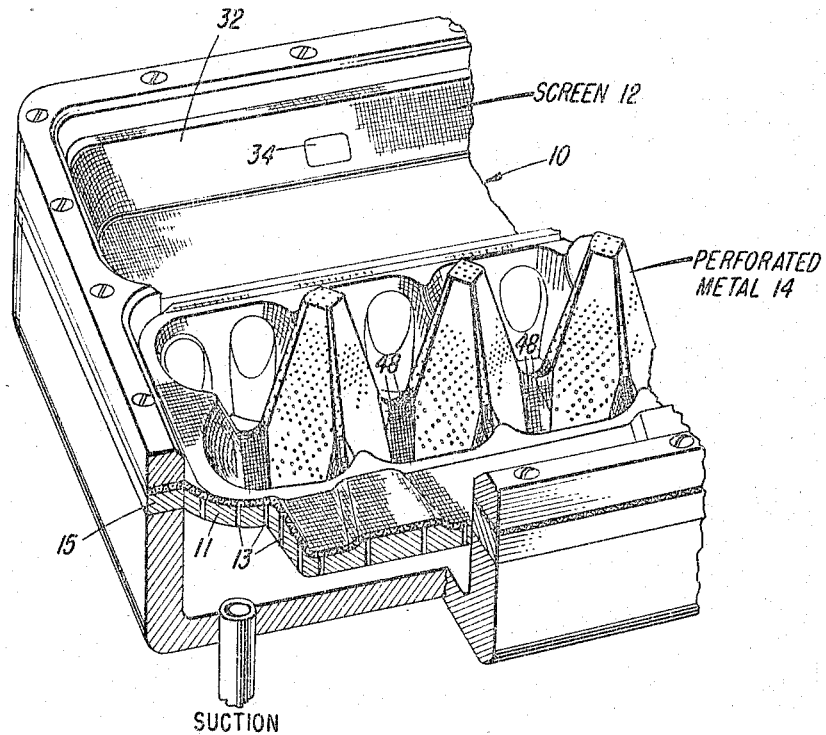
FIG. 1 is a partial perspective view of the molding die in accordance with the present invention.
Figure 2:
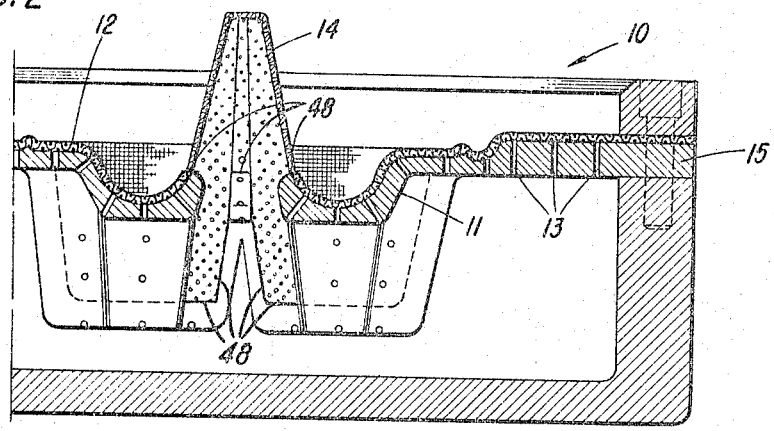
FIG. 2 is a cross-sectional view of the molding die of FIG. 1.

This discovery of the unexpected results obtained by use of perforated material dies having the characteristics as described herein, as compared with wire screen dies has many applications. As shown in FIGS. 1 and 2, a molding die 10 is illustrated which is formed from the conventional wire screen material 12, as shown in FIGS. 4 and 5, with certain portions thereon removed and with the perforated material 14, as shown in FIGS. 6 and 7 substituted therefor. A forming member 11 is located immediately below the die and is provided with a plurality of apertures 13 passing therethrough. The edge of the former is provided with a flange 15 which is bolted to the apparatus. The molding die 10 is shaped to correspond to the shape of the former 11 and is also bolted to the apparatus. The pulp forms on the die. The die 10 is used for molding egg cartons 16, shown in FIG. 3.

The egg carton 16 comprises a lower bottom or egg receiving section 18, to which is hingedly connected at 20 a lock flap 22. Hingedly connected opposite the lock flap 22 as indicated at 24 is a substantially planar lid or cover member 26.

The cover member 26 includes a substantially planar top 28 integral with an outwardly angled or diverging peripheral side wall 30. The front forward wall 32 has longitudinally spaced apertures or slots 34 extending therethrough for receiving locking buttons 36 projecting forwardly from the lock flap 22.

The lower or egg receiving section 18 of the carton includes a plurality of substantially similar egg receiving cells indicated generally at 38, each of the cells being separated one from the other by means of longitudinally and transversely extending saddle portions 40. Intersecting pairs of the saddle portions 40 substantially define edge portions of frusto-pyramidal separator posts indicated generally at 42 which terminate in a substantially square top portion 44, the corners of which are disposed in alignment with the saddle portions 40. The upper portions 44 of the separator posts 42, will abuttingly engage the inner surface of the planar top 28 for absorbing force on the cover member and transmitting it through the post to the bottom portions of the cells without injury to the eggs contained therein.

As shown in FIG. 3, the portion 46 of each separator post 42 is molded to have a lesser thickness than the remainder of the carton. This is accomplished by use of the molding die shown in FIGS. 1 and 2 wherein the perforated material 14 in accordance with this invention is substituted for the conventional wire screen 12 at the upper portion of each separator post. At 48 in FIGS. 1 and 2 there is shown the joint between the wire screen and the perforated material. This joining of the perforated material 14 to the wire screen 12 can be accomplished by means of soldering, spot welding or the use of tabs or other connectors distributed along the joint of the two materials.

The resulting egg carton, as shown in FIG. 3 has advantages over the same egg carton which has previously been conventionally molded with a uniform thickness of pulp. First of all there is a saving in the overall weight of the carton. But more important, the resulting egg carton will nest better and have considerably less denesting resistance. Where the egg carton is molded of one thickness in the conventional way, pulp tends to build up in crevices and at intersections of planes, such as at the posts of the carton. The resulting carton when nested, will tend to jam tightly together, being squeezed in the post sections, while the cover sections have actual clearance between them. The present egg carton with the posts made thinner than the covers, lessens the denesting resistance of a stack of such cartons and further, a given number could take up less space.

This method can also be applied to other pulp molded articles to lessen the nesting interval and to economize on the amount of pulp required for a given article by lessening the thickness of the stronger portions of the article while maintaining the weaker portions at their present thickness.

Figure 9:
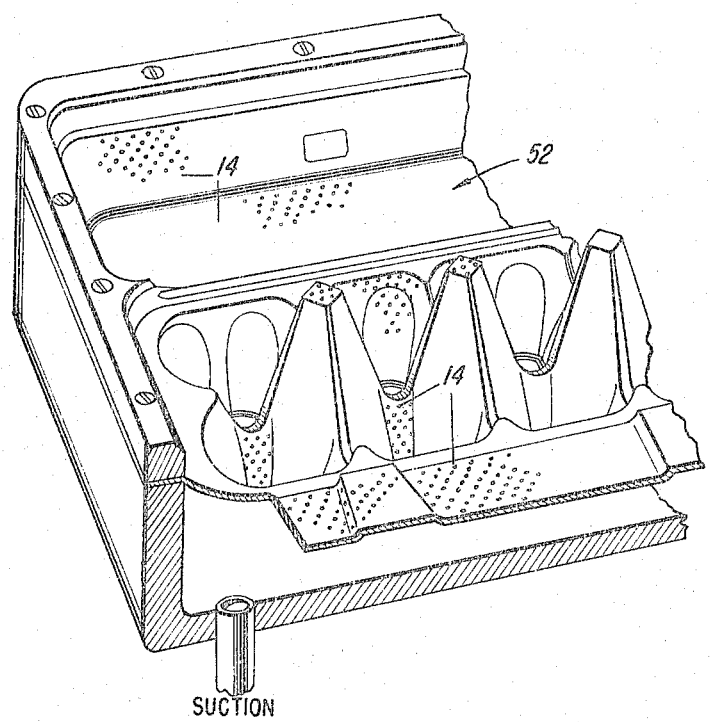
FIG. 9 is a partial perspective view of a modified form of molding die in accordance with the present invention.
Figure 10:
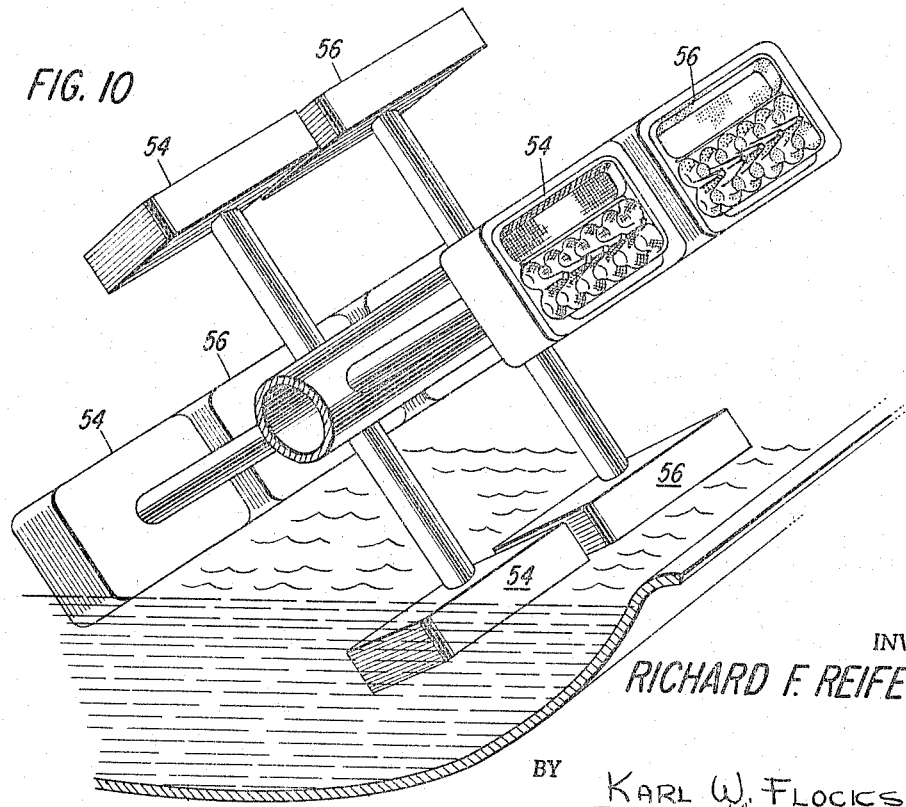
FIG. 10 is a partial perspective view of pulp molding apparatus in accordance with the present invention.

The use of this new molding die has other uses. For example, as shown in FIG. 9, the entire die 52 may be fabricated from the perforated material. For a given interval in the pulp bath with the same suction, a lesser amount of pulp will be uniformly deposited to form a thinner article than would be deposited under the same conditions using the conventional wire screen. As shown in FIG. 10, apparatus is shown wherein two dies 54 and 56 are simultaneously immersed in the pulp bath for deposition of the pulp. The die 54 is shown to be made of the conventional wire screen whereas die 56 is shown to be made of perforated material in accordance with the present invention. For a given dip interval, the die 54 will deposit a thicker article than will die 56, thus in a single dip two different articles with different thicknesses can be simultaneously deposited.

Broadly the perforated material die or portion of the die in accordance with the present invention is a thin sheet of material, preferably a metal such as brass, although any metal can be used such as nickel, copper, stainless steel, etc. which is sufficiently flexible and can be punched with the required size of perforations. Non-metallic materials can also be used with the above properties or can be cast in finished form. The perforated material may be made of plastic film, such as polyethylene, polypropylene, vinyl resins, polystyrene or polyesters. The thickness of the perforated material is preferably approximately the same as the diameter of the perforations, although this is not critical so long as the resultant perforated material is flexible enough to be formed into the desired complex shapes. The perforations have a diameter of 0.006"–0.031", and the resultant sheet has an open area of perforations of 3–20%.

These limitations are critical in order to obtain a significant percent reduction of pulp deposit over that obtained using the conventional wire screen molding die.

For certain purposes, a coarse backing wire screen may be inserted between the perforated material die and the forming member similar to that used with a conventional wire screen die. For some purposes the usual forming member 11 with relatively large holes 13 on ½" centers can be dispensed with completely and replaced with skeleton-like back-up structure. It should be understood, however, that the amount of drainage through the forming member must be much greater than that through the perforated material die.

In a specific example, a die was made of a perforated brass sheet .016" thick with perforations .016" in diameter uniformly spaced over the sheet and with 6.4% open area in the die. In this perforated sheet the perforations were .046" apart. The pulp deposited showed a reduction of 40% over that deposited using the same pulp, same interval of dip and the same vacuum when using a conventional wire screen die.

In another specific example, another die was made of a perforated brass sheet of .016" thick with perforations .016" in diameter and with 18% open area in the die. The perforations were .014" apart. The pulp deposited showed a reduction of 18% over that deposited under the same conditions when using a conventional wire screen die.

An egg carton was molded using the die illustrated in FIG. 1. The resultant egg carton showed a 40% reduction in pulp deposited on each supporting post where the perforated material was substituted for the wire screen. This egg carton with the thinner posts was found to have a considerably lesser denesting resistance in a stack of such cartons at the old denesting interval.

It should be noted that the pulp which deposits on the perforated material die will have a lesser weight per square inch than the pulp which deposits on the conventional wire screen. Thus, even though a compression step is applied to a newly deposited article having more than one thickness of deposit to render the thickness thereof virtually uniform, the weight per square inch of the originally thicker deposit in the final product will be greater than the weight per square inch of the final product of the portions with an originally thinner weight per square inch.

Figure 11:
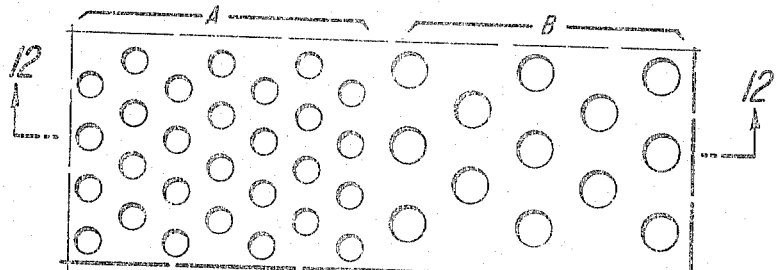
FIGS. 11–18 are enlarged top plan views of a small portion of perforated materials for use in pulp molding dies in accordance with modified forms of the present invention.
Figure 12:

The egg carton shown in FIG. 3 or other molded pulp articles of more than one thickness of pulp could also be molded using a die made entirely of perforated material. This die would include portions A (FIG. 11) where the thinner pulp deposit 60 is required which are made with perforations of 0.006"–0.031" in diameter and having an open area of 3–20%. The portions of the die B (FIG. 11) wherein the thicker deposit of pulp 60 is desired can be perforated with openings greater than 0.031" and with an open area of greater than 20%. The deposit of pulp on these areas B would be equivalent to that deposited on a conventional wire screen molding die as shown in FIG. 12. An illustration of a perforated material showing the two different sizes of perforations and open area is shown in FIGS. 11 and 12.

Figure 13:
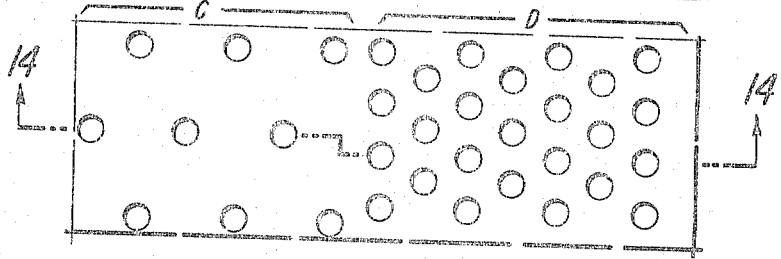
Figure 14:

When a pulp article is desired to be deposited having an overall lesser deposit of pulp and yet wherein certain areas of the article have a still lesser deposit than others, a perforated material die can be used similar to that illustrated in FIGS. 13 and 14, wherein all sections of the die are within the critical limits defined above for obtaining a reduction in pulp deposit yet wherein portions have a lesser open area than other portions. For example, the portion of the die illustrated as C in FIG. 13 might have an open area of 6% whereas the section identified as D might have an open area of 20%.

Figure 15:
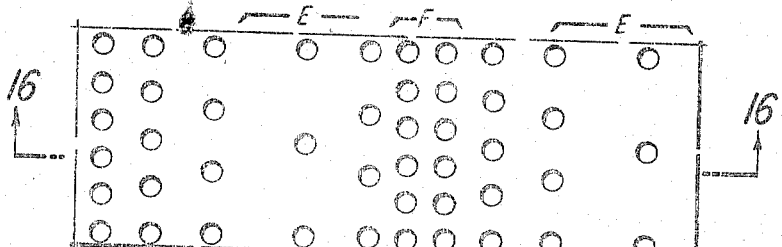
Figure 16:
Figure 17:
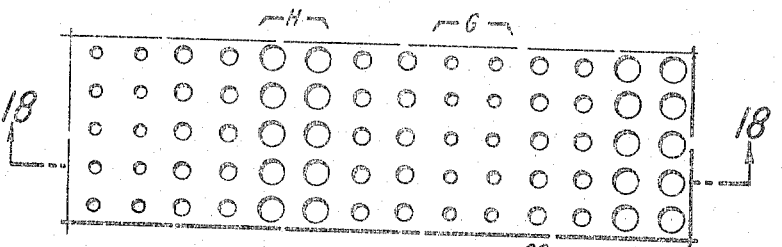
Figure 18:

If it is desired to mold an article having variable thicknesses within the same article, the perforations in the die can be so regulated as to size and pattern distribution so that the amount of pulp deposit in all portions of the article can be closely controlled. As illustrated in FIGS. 15 and 16, the perforations are all shown to be of the same size. However, their distribution is varied in a continuous pattern on the die so as to deposit gradually varying thicknesses of pulp from a minimum at the portions E thereon to a maximum at the portions F thereon. As shown in FIGS. 17 and 18 a similar effect can be obtained by increasing the size of the perforations as well as distribution of the perforations to yield an even greater increase in the pulp deposit from the sections labeled as G as compared to the sections labeled as H.

The perforated material die acts to force horizontal drainage of water through the pulp which is greater than the thickness of the pulp as it is deposited, thereby making the rate of deposit depend upon the horizontal travel of the water through the pulp rather than only the vertical travel through the thickness of the pulp. This is an essential difference from the formation on normal woven die surfaces or using perforated material surfaces with large enough perforations so spaced as not to restrict the total potential drainage capacity of the pulp as it is formed.

It will be obvious to those skilled in the art that various changes may be made without departing from the spirit of the invention and therefore the invention is not limited to what is shown in the drawings and described in the specification but only as indicated by the appended claims.

What is claimed is:

1. A pulp molding die comprising a perforated material shaped in the configuration of the article to be molded, certain areas of said die having perforations of 0.006–0.031" in diameter and an open area of between 3–20% and other areas of said die having perforations greater than 0.031" diameter and an open area greater than 20%.

2. A pulp molding die comprising a perforated material shaped in the configuration of the article to be molded, said material containing perforations varying in diameter in different portions of the die within the range of 0.006–0.031", and having an open area of between 3–20% in all parts thereof.

3. A pulp molding die in the configuration of the article to be molded comprising certain portions thereof where a thicker deposit of pulp is desired being made of conventional wire screen that will not restrict drainage and other portions thereof where a thinner deposit of pulp is desired being made of a perforated material having perforations between 0.006–0.031" in diameter and the open area being between 3–20% wherein drainage is restricted.

4. A pulp molding die in accordance with claim 3 wherein said perforations are of uniform size and distribution.

5. A method of simultaneously molding a fibrous pulp article having at least one significant portion thereof of lesser effective thickness than the significant remainder of the article which comprises: applying suction to a significant portion of the face of a foraminous suction molding die through a plurality of perforations through said die which are regularly spaced from each other and are of uniform size, said perforations having a diameter of 0.006–0.031" and being spaced so as to yield an open area of between 3–20% and said suction is applied to said perforations through said die to form said one significant portion of the article of lesser effective thickness while simultaneously substantially generally applying suction to a remaining significant portion of said die through perforations having an open area of greater than 20% of said die surface portion to form simultaneously a significant remaining portion of said article of greater effective thickness.

6. A method of simultaneously molding a fibrous pulp article having at least one significant portion thereof of lesser effective thickness than the significant remainder of the article which comprises: applying suction to a significant portion of the face of a foraminous suction molding die through a plurality of perforations through said die which are spaced from each other, said perforations having a diameter of 0.006–0.031" and being spaced so as to yield an open area of between 3–20% and said suction is applied to said perforations through said die to form said one significant portion of the article of lesser effective thickness and simultaneously substantially generally applying suction through the openings of a remaining significant portion of said die made of conventional wire screen having an open area of greater than 20% of said die surface to form a significant remaining portion of said article of greater effective thickness.

References Cited

UNITED STATES PATENTS

| | | | |
|---|---|---|---|
| 2,723,600 | 11/1955 | Kyle | 162—219 |
| 2,961,368 | 11/1960 | Lyons | 162—219 |
| 3,001,582 | 9/1961 | Kindseth et al. | 162—411 |
| 3,028,065 | 4/1962 | Reifers | 229—2.5 |
| 3,067,921 | 11/1962 | Reifers | 229—2.5 |

S. LEON BASHORE, *Primary Examiner.*

JOSEPH R. LECLAIR, DONALL H. SYLVESTER,
*Examiners.*

J. F. McNULTY, J. H. NEWSOME,
*Assistant Examiners.*